United States Patent [19]
Gould

[11] Patent Number: 5,568,158
[45] Date of Patent: * Oct. 22, 1996

[54] ELECTRONIC VARIABLE POLARIZATION ANTENNA FEED APPARATUS

[76] Inventor: Harry J. Gould, 1649 E. Hale, Mesa, Ariz. 85203

[*] Notice: The portion of the term of this patent subsequent to Sep. 14, 2010, has been disclaimed.

[21] Appl. No.: 210,132

[22] Filed: Mar. 17, 1994

Related U.S. Application Data

[63] Continuation-in-part of Ser. No. 855,250, Mar. 23, 1992, abandoned, which is a continuation-in-part of Ser. No. 562,686, Aug. 6, 1990, abandoned.

[51] Int. Cl.⁶ .................. H01Q 23/00; H01P 1/161; H04R 1/12
[52] U.S. Cl. .............. 343/756; 343/853; 333/21 A; 455/278.1; 455/284; 455/304; 455/305
[58] Field of Search ............... 333/21 A; 342/361, 342/362; 343/756, 786, 840, 853; 455/276, 278, 284, 302–305

[56] References Cited

U.S. PATENT DOCUMENTS

| | | | |
|---|---|---|---|
| 3,963,990 | 6/1976 | DiFonzo | 333/21 A |
| 4,233,576 | 11/1980 | Pelchat | 333/21 A |
| 4,313,220 | 1/1982 | Lo et al. | 455/304 |
| 4,498,061 | 2/1985 | Mörz et al. | 333/21 A |
| 4,561,067 | 12/1985 | McKeown | 455/305 |
| 4,595,890 | 6/1986 | Cloutier | 333/21 A |
| 5,068,668 | 9/1991 | Tsuda et al. | 333/21 A |
| 5,245,353 | 9/1993 | Gould | 343/786 |

FOREIGN PATENT DOCUMENTS

| 0083101 | 7/1981 | Japan | 333/21 A |
|---|---|---|---|

OTHER PUBLICATIONS

Kreutel, Jr. et al., Antenna Technology for Frequency Reuse Satellite Communications, Proceedings of the IEEE, vol. 65, No. 3 Mar. 1977 pp. 370–378.

*Primary Examiner*—Peter Toby Brown
*Attorney, Agent, or Firm*—H. Gordon Shields

[57] ABSTRACT

Electronically adaptable polarization antenna feed apparatus for receiving any sense of linear polarization or for receiving either sense of circular polarization. The circuit makes use of variable gain amplifiers and/or variable attenuators in each of two orthogonally polarized paths. The signal to noise ratio of a desired polarization sense is maximized by adjusting the amplitude or gain in each path to a desired ratio. If desired, polarization components from the two probes may be combined so that orthogonal polarization senses from two frequency reuse signals be used simultaneously. The apparatus may be used with linearly polarized signals and with circularly polarized signals.

11 Claims, 3 Drawing Sheets

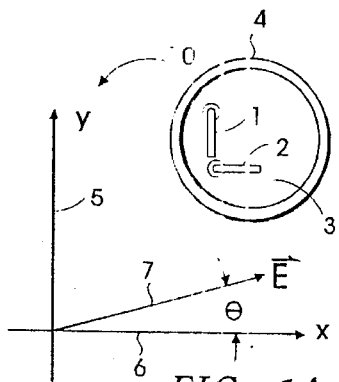
FIG. 1A
For maximum signal to noise ratio:
$$\boxed{\frac{R_y}{R_x} = \tan\theta}$$
FIG. 1C
$\vec{E}$ = a polarized radio signal.
G = Gain of amplifier.
N = Noise power of Amplifier.
$R_x$ = Voltage Attenuator for signals in x path.
$R_y$ = Voltage Attenuator for signals in y path.
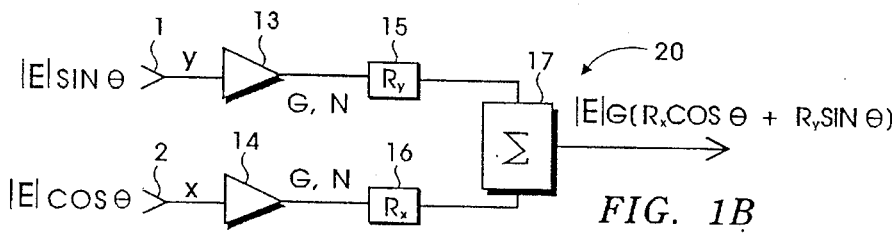
FIG. 1B
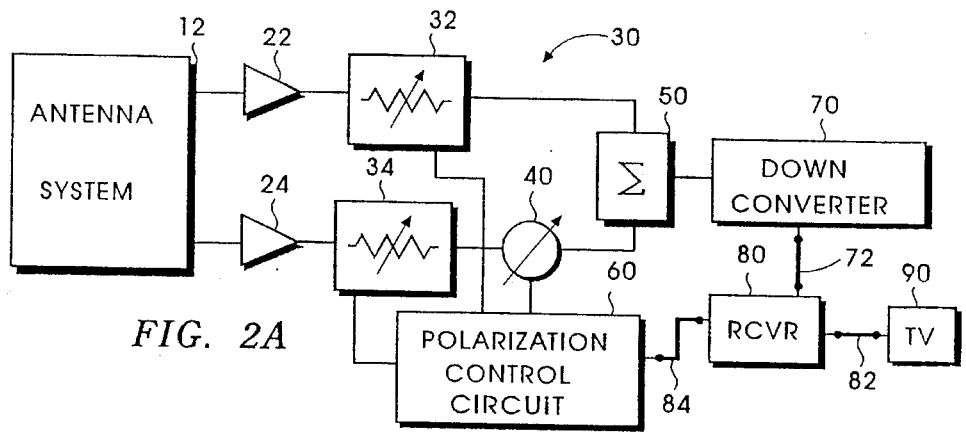
FIG. 2A
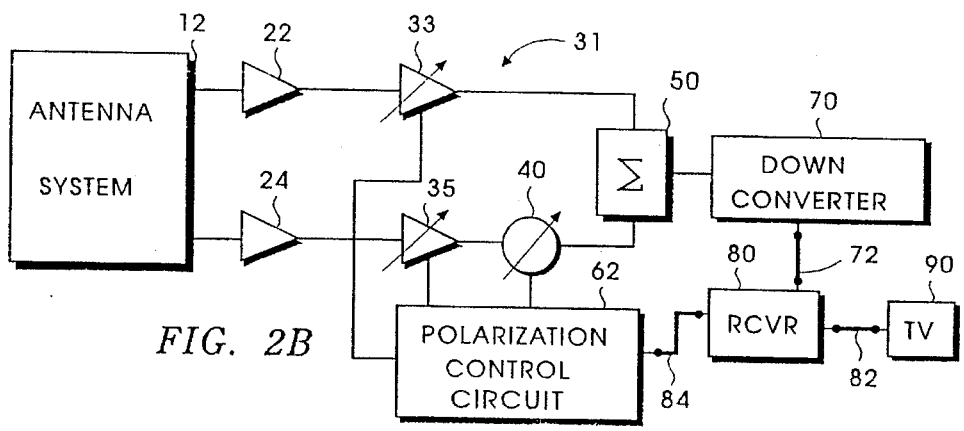
FIG. 2B

ELECTRONIC VARIABLE POLARIZATION ANTENNA FEED APPARATUS

CROSS-REFERENCE TO RELATED APPLICATION

This application is a continuation in part application of Ser. No. 07/855,250, filed Mar. 23, 1992, now abandoned which was a continuation-in-part application of Ser. No. 07/562,686, filed Aug. 6, 1990, now abandoned.

BACKGROUND OF THE INVENTION

1. Field of the Invention

This invention relates to antenna receiving apparatus for receiving radio frequency signals and, more particularly, to antenna feed apparatus for receiving polarized radio signals.

2. Description of the Prior Art

Satellite to ground transmission has become increasingly popular over the last twenty years. It offers the advantage of a single ground to satellite uplink point of being able to transmit its information to virtually every part of the United States or to a majority of a hemisphere of the earth.

One of the most popular uses of satellite to ground transmissions is for TeleVision Receive Only or TVRO. It is used by TV networks to get their messages to as many local affiliates and into as many households as possible. Within the last ten years approximately three million home owners in the United States alone have invested in their own TVRO or satellite dish receiving system.

Since the signal transmitted from a satellite is generally very weak, it is important that the signal, which is gathered by an antenna and focused into a feed, is amplified by a low noise amplifier (LNA) which contributes as little amplifier noise to the signal as possible. Since all LNAs add noise to the signal which is being amplified, it is important that the LNAs are designed to minimize the amplifier noise contribution. It is also important that the polarization of the feed is aligned with the incoming signal to maximize the signal to noise ratio. Since the amplifier will add a fixed level of noise power to the signal even when the polarization of the feed is misaligned, the signal to noise ratio of the feed system will be less than maximum when the polarization of the feed is not properly aligned.

Signals are typically transmitted from a satellite in either linear or circular polarizations. In order to maximize the use of a satellite bandwidth, most satellites will transmit two sets of signals within the same frequency band but at polarizations which are orthogonal to each other. For example, a satellite can transmit one set of signals with a vertical linear polarization and a second set of signals with a horizontal linear polarization, or a first set with right hand circular polarization (RHCP) and a second set with left hand circular polarization (LHCP).

The receiving ground system must have a feed which can adapt to the transmitted polarizations. This practice of transmitting and receiving two orthogonal polarizations is commonly referred to as frequency reuse.

Although the cost of home satellite dish systems has dramatically dropped in the last ten years, the cost of such a system still prevents many homes from investing in a satellite dish. The present invention is a simple and low cost antenna feed apparatus for receiving polarized signals from satellites, and, at the same time, gives increased performance over the feed apparatus in common use at the present time.

The most commonly used feed for the home satellite dish market is an electro-mechanical design which was made popular by Chaparral Communications Corp. of San Jose, Calif. This design, which is described in U.S. Pat. No. Re. 32,835 (Howard), has a probe disposed through the center of the back wall of a circular waveguide. An electric servomotor is used to rotate the probe to pre-set positions where it is aligned to the electric field of the incoming satellite signal.

Since the '835 apparatus will adapt to any sense of linear polarization, it can be mechanically installed without regard to polarization alignment. The apparatus of the '835 patent may be contrasted to fixed polarization designs which often require repeated mechanical adjustments and tests during the installation process.

After installing the type of feed shown in the '835 patent, the homeowner, through the use of a polarization control circuit, is able to determine the preset positions of the probe. The apparatus of the '835 patent, which is limited to receiving only linear polarizations, has inherent losses which reduce the signal to noise ratio. Since the probe must be mechanically rotated each time the operator desires to switch frequency reuse bands, its response time is noticeably slow. This type of feed is normally connected directly to a Low Noise Amplifier (LNA) or a Low Noise Block Downconverter (LNB) to complete the antenna feed circuitry.

An all electronic feed which makes use of two orthogonal signal paths to form an adaptive polarization system is described in U.S. Pat. No. 5,068,668 (Tsuda et al). The '668 patent describes circuits which are very complex and which are not likely to instantaneously perform well over the total bandwidth of a TVRO system. The apparatus of the '668 patent does not make use of variable attenuators or variable gain amplifiers in each of the two signal paths which could have simplified his circuits. In the presence of two incoming frequency reuse signals with orthogonal polarizations, the Tsuda et al circuit is likely to become confused about which polarization to lock onto. Furthermore, the circuit provides no means for switching between the two orthogonal polarizations.

In U.S. Pat. No. 4,233,576 (Pelchat) describes an adaptive polarization receiver system which is a complex arrangement of waveguide polarizers, OMT's, and phase sections. This type of system is probably too expensive and is probably too cumbersome to be of practical use in the home satellite dish market.

SUMMARY OF THE INVENTION

The invention described and claimed herein comprises an electronic circuit which may be adapted to an antenna feed for the reception of polarized radio frequency (RF) signals. Through the use of a combiner and variable gain amplifiers or variable attenuators the signals from two orthogonally polarized signal paths are combined such that a maximum signal to noise ratio is obtained for a desired polarization. Alternately, the components from both signal paths may be combined in separate combiners such that maximum signal to noise ratios are simultaneously obtained for each of the incoming frequency reuse signals.

Among the objects of the present invention are the following:

To provide new and useful electronic circuitry which adjusts the polarization of an antenna feed to match the polarization of an incoming signal;

To provide new and useful TVRO apparatus in which an antenna feed includes a back wall and pair of probes extending through the back wall;

To provide new and useful antenna feed apparatus in which a maximum signal to noise ratio is achieved; and To use variable gain amplifiers and/or variable attenuators with a combiner circuit to combine the orthogonal components of a polarized radio signal to achieve a maximum attainable signal to noise ratio.

BRIEF DESCRIPTION OF THE DRAWING

FIG. 1A depicts orthogonal relationships for a polarized signal and an antenna feed.

FIG. 1B is a schematic representation of the apparatus of the present invention.

FIG. 1C shows a necessary relationship to achieve a maximum signal to noise ratio.

FIG. 2A is a schematic diagram of the apparatus of the present invention.

FIG. 2B is a schematic diagram of an alternate embodiment of the apparatus of FIG. 2A.

DESCRIPTION OF THE PREFERRED EMBODIMENT

Figure 4:
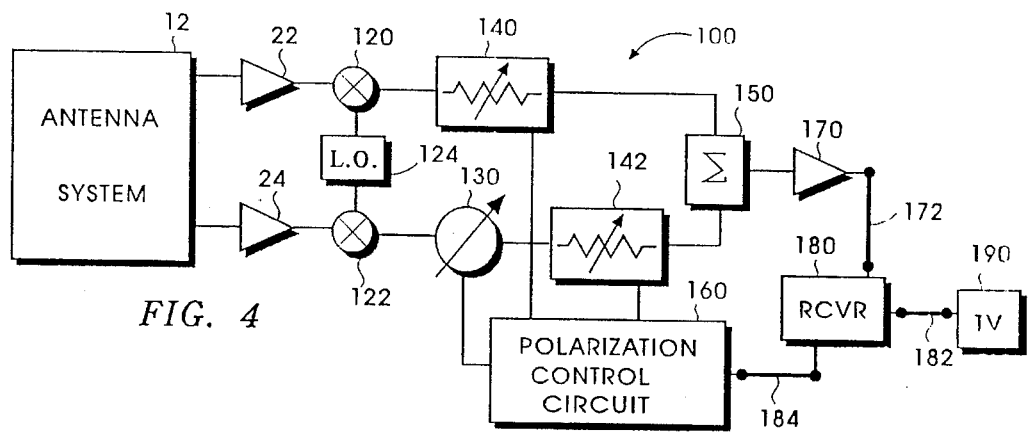
FIG. 4 is a schematic diagram of another alternate embodiment of the apparatus of the present invention.

FIG. 1A depicts circuit 10 in which a linearly polarized electric field E is oriented at an angle $\Theta$ with respect to a horizontal x-axis 6. A circular waveguide 4 is shown with a probe 1 aligned generally parallel to a y-axis 5 and a second probe 2 is aligned generally parallel to the x-axis 6. The x-axis 6 is orthogonal to the y-axis 5, and probe 1 is substantially orthogonal to probe 2. The first and second probes each extend through a back wall 3 of the circular waveguide 4.

FIG. 1B depicts a circuit 20 in which the probe 1 is connected to an amplifier 13. The output of the amplifier 13 is connected to the input of variable voltage attenuator 15, while the probe 2 is connected to the input of an amplifier 14. The output of the amplifier 14 is connected to the input of a variable voltage attenuator 16. The outputs of attenuators 15 and 16 are summed in a combiner 17. Amplifiers 13 and 14 each have a voltage gain of G and they add a noise power of N to their respective paths, while the variable voltage attenuators 15 and 16 attenuate their paths by values Ry and Rx, respectively.

To achieve a maximum signal to noise ratio for the summer components, the ratio of Ry over Rx equals Tan $\Theta$ is a necessary relationship. The signal to noise ratio resulting from this relationship is substantially equal to the signal to noise ratio that would be achieved by feeding 100% of signal E into a single LNA with a gain of G and a noise power equal to N.

When $\Theta=0$ or 90 degrees, the E field 7 is aligned with either the x-axis probe 2 or the y-axis probe 1. For the case of $\Theta=0$, the signal is 100% coupled to the x-axis probe. In that case, attenuator Ry is set to zero for maximum signal to noise ratio. With Ry=0, the noise power from the LNA in the y-axis is 100% attenuated. Conversely, with $\Theta=90$ degrees, the signal E is 100% coupled to the y-axis probe and attenuator Rx is set to zero.

FIG. 2A is a schematic representation of circuit apparatus 30 which embodies the apparatus of the present invention and which demonstrates how the feed apparatus may be installed for a typical home satellite TVRO system. The circuit apparatus 30 includes an antenna system 12. The antenna system 12 may include two orthogonally positioned probes in a waveguide such as shown in FIG. 1. The antenna system 12 is connected to the inputs of a pair of LNAs 22 and 24. The LNAs 22 and 24 each have a gain of G and add a noise power equal to N at their outputs.

The outputs of the LNAs 22 and 24 are connected to the inputs of variable attenuators 32 and 34, respectively.

The output of variable attenuator 34 is connected to the input of a phase shifter 40. The outputs of the phase shifter 40 and the variable attenuator 32 are combined in a summing network 50. The output of the summing network 50 is connected to the input of a down-converter 70. The variable attenuators 32 and 34 and the phase shifter 40 are each connected to a polarization control circuit 60.

It is understood that for linear polarizations substantial polarization changes can be realized without the use of phase shifter 40. To receive any sense of linear polarization, phase shifter 40 needs to have only a zero (0) degree position and a one-hundred eighty (180) degree position. Therefore, a fixed phase relationship of either zero (0) degrees or a one-hundred eighty (180) degrees is all that is required to receive one-half of the full range of linear polarizations.

The summing network 50 is often referred to as a power combiner or just a combiner. It is understood that many different types of circuits can be utilized as a combiner or summing network. Among these circuits are simple power dividers and hybrid coupler circuits with the proper phase relationships. A power combiner and a power splitter are often the same circuit with their input(s) and output(s) ports reversed.

The output of the down-converter 70 is connected by a conductor 72 to the input of a receiver 80, and the output of the receiver 80 is connected by a conductor 82 to a TV 90. The receiver 80 is also connected by a conductor 84 to the polarization control circuit 60. The antenna system, LNAs, variable attenuators, phase shifter, summing network, and polarization control circuit form the typical feed network.

The receiver 80, which is typically located in the home, processes the signal received from the down-converter into a format acceptable to the TV set 90.

The receiver 80 also determines the polarization position of the feed by sending a logic signal to the polarization control circuit 60. The polarization control circuit 60 adjusts the ratio of the attenuator 32 to the attenuator 34 to yield a maximum signal to noise ratio for the incoming polarized RF signal, as discussed above and as shown in FIG. 1C. At the same time, the polarization control circuit 60 determines the position of the phase shifter 40. Phase shifter 40 will typically have two phase positions.

If the feed system is set to receive linearly polarized signals, phase shifter 40 will typically have a zero (0) degree position and a one hundred and eighty (180) degree position. Each time the polarization of the feed is switched between the two frequency reuse bands, the position of the phase shifter is switched and, correspondly, the ratio of attenuator 32 to attenuator 34 is readjusted. If the feed is set to receive circular polarizations, the phase shifter will typically have a plus ninety (90) degree position and a minus ninety (−90) degree position for the reception of LHCP or RHCP signals. The ratio of attenuator 32 to attenuator 34 is typically set to one for the reception of either RHCP or LHCP signals.

Variable attenuators 32 and 34 are typically constructed using a pin diode circuit. The circuit will typically include one, two, or three or more pin diode junctions. The amount of attenuation is determined by applying a DC current through the junction of the pin diode. A single pin diode junction becomes less resistive as the current is increased.

FIG. 2B shows a schematic representation of circuit 31 which is an alternate embodiment of circuit 30 in FIG. 2A. Circuit 31 uses a pair of variable gain amplifiers (VGAs) 33 and 35 in place of the variable attenuators in circuit 30. The antenna system 12 and the LNAs 22 and 24, and the other circuit elements of the apparatus 30 are also included in the circuit apparatus 31.

VGAs are typically as effective as variable attenuators in adjusting the ratio of the signals in the two paths. The choice of variable attenuators or VGAs in any of the circuits of the present invention will be determined by design constraints such as cost, availability of parts, engineering preferences, etc.

It will be conversely understood that variable gain amplifiers (VGAs) 33 and 35 can be used in place of attenuators 32 and 34 in circuit 30. Both VGAs and variable attenuators are equally effective in adjusting the ratio of the two signal paths for a maximum signal to noise ratio.

For most of the embodiments discussed herein, either VGAs or variable attenuators may be used. However, in some embodiments it may be best to use VGAs, while in other embodiments variable attenuators may be the best choice. If a VGA is designed to have substantial negative gain as well as positive gain, only one VGA in either path is required to adjust the ratio of the gains in the two signal paths to realize a maximum signal to noise ratio for most incoming linear polarizations. The application of the present invention applies to the use of variable attenuators, VGAs, or a single VGA to adjust the ratio of the two signal paths for a maximum signal to noise ratio.

Figure 3:
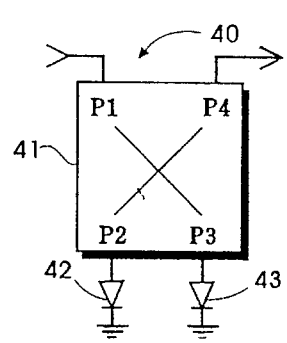
FIG. 3 is a schematic diagram of a phase shifter.

FIG. 3 shows a typical phase shifter circuit constructed from a single hybrid coupler 41 and two pin diodes 42 and 43. The circuit may be used for the variable phase shifter 40. The signal enters the hybrid coupler 41 at port P1. The signal is then split in the hybrid coupler 41 with substantially equal portions exiting ports P2 and P3, where the split signal enters diode junctions 42 and 43, respectively.

If pin diodes are used for the elements 42 and 43, the diodes are biased to either an off or on condition. In the on state the signal currents flow through the diodes and are shorted to ground, while in the off state the diode junctions act as an open circuit to the signal currents.

In the "on" state the circuit is representative of an one-hundred eighty (180) degree phase shifter, while in the "off" state the circuit is representative of a zero (o) degree phase shifter. In either case the signal is reflected back and re-enters hybrid coupler 41 at ports P2 and P3. Substantially all of the signal then exits the hybrid coupler at port P4 with its phase at either a (0) or (180) degree position. Other circuits can be used to get the appropriate phase shift.

In circuit apparatus 40, well known and understood elements such as capacitors and elements of the bias circuit have been omitted.

FIG. 4 discloses circuit apparatus 100, which comprises an alternate embodiment of the circuitry of FIGS. 2A and 2B. Again, the antenna system 12 and LNAs 22 and 24 are included in the circuit apparatus. The received signals are down frequency converted prior to entering a power combiner 150. In FIG. 4, the antenna system 12 conducts orthogonally received signals to the pair of LNAs 22 and 24. The outputs of LNAs 22 and 24 are connected to the inputs of a pair of mixers 120 and 122, respectively. A local oscillator (L.O.) 124 supplies bias currents to both mixers 120 and 122. The output of mixer 122 is connected to the input of a phase shifter 130. The phase shifter 130 has a zero degree position and a plus one hundred eighty degrees position for receiving linearly polarized signals and a plus ninety degree position and a minus ninety degree position for the reception of circularly polarized signals.

The outputs of mixer 120 and phase shifter 130 are connected to the inputs of variable attenuators 140 and 142, respectively. The outputs of variable attenuators 140 and 142 are connected to the power combiner 150 where the orthogonal signals components from each of the two paths are combined. The output of the power combiner 150 is connected to the input of an amplifier 170.

The output of the amplifier 170 is connected by a conductor 172 to the input of a receiver 180. The output of the receiver 180 is connected by a conductor 182 to a TV 190.

The receiver 180 outputs a logic signal by way of a conductor 184 to the input of a polarization control circuit 160. The polarization control circuit 160 outputs control signals to the phase shifter 130 and variable attenuators 140 and 142. The attenuation values of the elements 140 and 142 are set to realize a maximum signal to noise ratio for the polarized RF signal received by the antenna system 12.

Local oscillator 124 and mixers 120 and 122 comprise down converters for each of their respective signal paths. By using a common oscillator for each of the mixers 120 and 122, the intermediate frequency (IF) leaving each of the mixers 120 and 122 retains the same coherency with the signal in the orthogonal signal paths that it had prior to entering the mixers. In all of the embodiments of the present invention it is important for each of the orthogonal signal paths to retain their coherency at the time they are combined in a power combiner.

It is important to understand that the signals may be down converted prior to entering the phase shifter(s) 40, 130 or the variable attenuators 32, 34, 140, 142 and the VGAs 33, 35. It is also possible to phase shift a signal path prior to it being down converted, or, under certain circumstances, it may be advantageous to have a VGA or variable attenuator prior to down converting the first RF signal path and to have the second VGA or variable attenuator after the second RF signal path is down converted.

Figure 5:
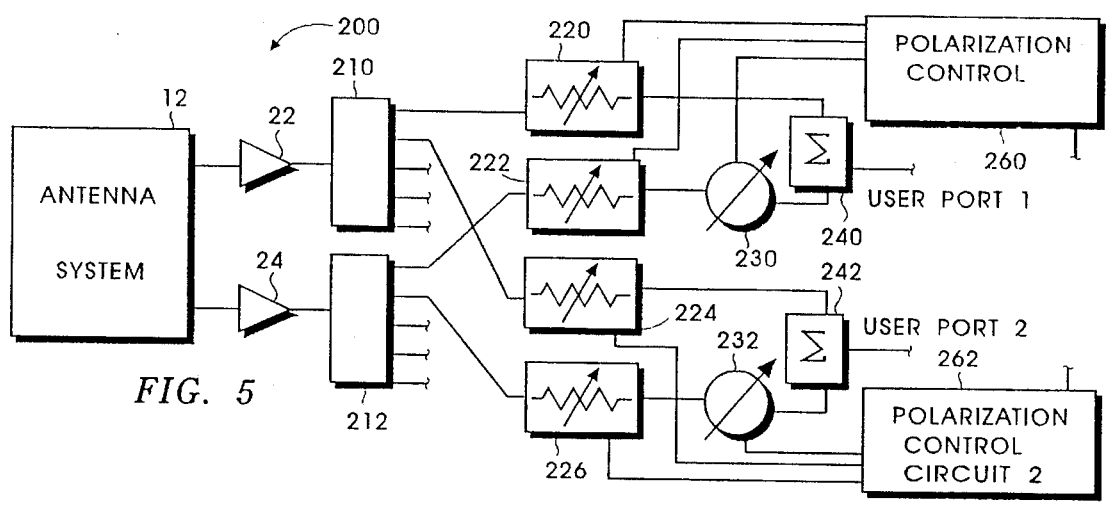
FIG. 5 is a schematic diagram of another alternate embodiment of the apparatus of the present invention.

FIG. 5 shows another alternate embodiment of the present invention in a circuit 200. In circuit 200 power splitters are used to create multiple user ports, with each user port having control of its own polarization control circuit independent of all the other ports. By using circuit 200, the user on port 1 could adjust his polarization control circuit to receive a maximum signal to noise ratio for one of the frequency reuse signals, while a user on any of the other ports could adjust his polarization control circuit to receive a maximum signal to noise ratio for the orthogonal frequency reuse signal. As in the prior circuits, variable attenuators or VGAs may be used for each of the user ports to adjust each signal path for a maximum signal to noise ratio. Again, the antenna system 12 and the LNAs 22 and 24 are used.

In circuit 200 the antenna system 12 connects two orthogonal RF signal paths to the inputs of the pair of LNAs 22 and 24. The outputs of LNAs 22 and 24 are connected to the inputs of a pair of power splitters 210 and 212, respectively, where each of the two signals are split into multiple user paths. An output from the power splitter 210 is connected to the input of a variable attenuator 220, while a second output is connected to the input of a variable attenuator 224. An output from the power splitter 212 is connected to the input of a variable attenuator 222, while a second output is connected to the input of a variable attenuator 226.

The output of the variable attenuator 222 is connected to the input of a variable phase shifter 230. The output of the phase shifter 230 and the output of the variable attenuator 220 are combined in a power combiner 240. The output of the power combiner 240 is connected to a user port 1. The output of the variable attenuator 226 is connected to the input of a variable phase shifter 232, and the output of the phase shifter 232 and the output of the variable attenuator 224 are summed in a power combiner 242. The output of the power combiner 242 is connected to user port 2. The phase shifters 230 and 232 each have a zero degree position and a plus one hundred eighty degree position for receiving linearly polarized signals and a plus ninety degree position and a minus ninety degree position for receiving circularly polarized signals.

It is understood that more user ports can be formed from the outputs of power splitters 210 and 212. It is also understood that user port 1 or any of the other user ports can be further connected to down converters and receivers, as shown in FIGS. 2A and 2B.

Figure 6:
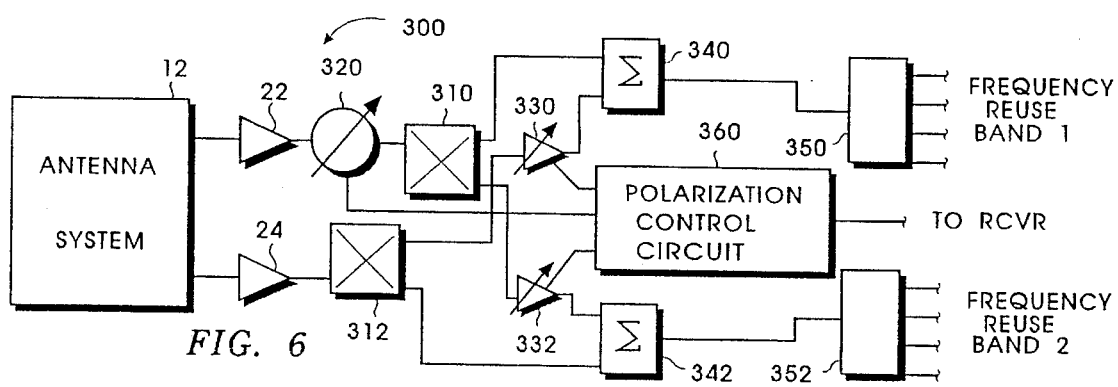
FIG. 6 is a schematic diagram of still another alternate embodiment of the apparatus of the present invention.

FIG. 6 shows another alternate embodiment of the present invention comprising circuit apparatus 300. As in the embodiments of FIGS. 2A, 2B, 4 and 5, the apparatus 300 utilizes the common antenna system 12 and the pair of LNAs 22 and 24. In circuit 300, couplers are used in each signal path after the antenna system 12 and the LNAs 22 and 24 to couple a portion of the RF signal from each RF path. The coupled signals are each connected to the input of a VGA. The output of each VGA is then combined with a signal from the orthogonal signal path providing separate frequency reuse bands at the output of each combiner. The output of each combiner may be split by power splitters to provide multiple user ports for each frequency reuse band.

A phase shifter 320 provides the appropriate phase shift between the two RF signal paths. If quadrature couplers are used for couplers 310 and 312, phase shifter 320 will typically have a plus ninety (+90) degree position and a minus (−90) degree position for the reception of orthogonal linearly polarized signals.

In circuit 300 the antenna system 12 connects two orthogonal signals to the inputs of the LNAs 22 and 24. The output of LNA 22 is connected to the input of phase shifter 320. The outputs of the phase shifter 320 and the amplifier 24 are connected to couplers 310 and 312, respectively. The coupled outputs from the couplers 310 and 312 are connected to the inputs of variable gain amplifiers 332 and 330 respectively. The second output from coupler 310 is combined with the output of VGA 330 in combiner 340, while the second output from coupler 312 is combined with the output of VGA 332 in combiner 342.

The output of the power combiner 340 is connected to a power splitter 350 to provide multiple user ports for frequency reuse band 1. The output of the power combiner 342 is connected to a power splitter 352 to provide multiple user ports for frequency reuse band 2.

A polarization control circuit 360 has outputs connected to VGAs 330 and 332 and phase shifter 320. The gains of VGAs 330 and 332 are adjusted to provide a maximum signal to noise ratio for each of their respective frequency reuse bands.

Figure 7:
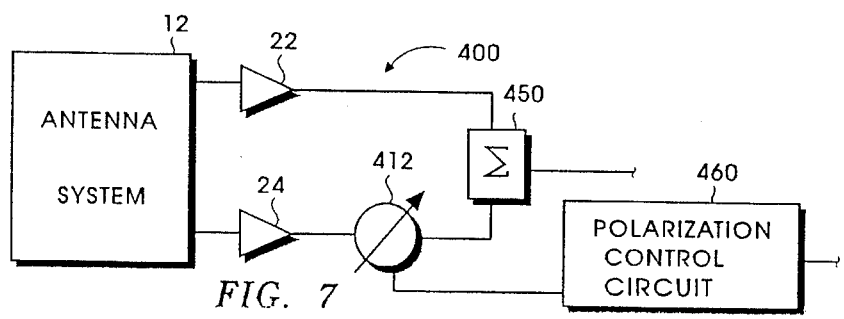
FIG. 7 is a schematic diagram of still another alternate embodiment of the apparatus of the present invention.

FIG. 7 shows another alternate embodiment of the present invention, comprising circuit apparatus 400. The circuit 400 also includes the antenna system 12 and the LNAs 22 and 24. In circuit apparatus 400 a phase shifter, which has a minus ninety (−90) degree and a plus ninety (+90) degree position, is used to switch between RHCP and LHCP signals. When receiving circularly polarized signals, unlike the case for linear polarizations, variable attenuators and(or) VGAs are not generally required.

In circuit 400, the antenna system 12 connects two orthogonal signals to the inputs of the LNAs 22 and 24. The output of the LNA 24 is connected to the input of a phase shifter 412. The output of the phase shifter 412 is combined with the output of the LNA 22 in a power combiner 450. A polarization control circuit 460 is connected to the phase shifter 412 and sets phase shifter 412 for either the (−90) degree position or the (+90) degree position.

Figure 8:
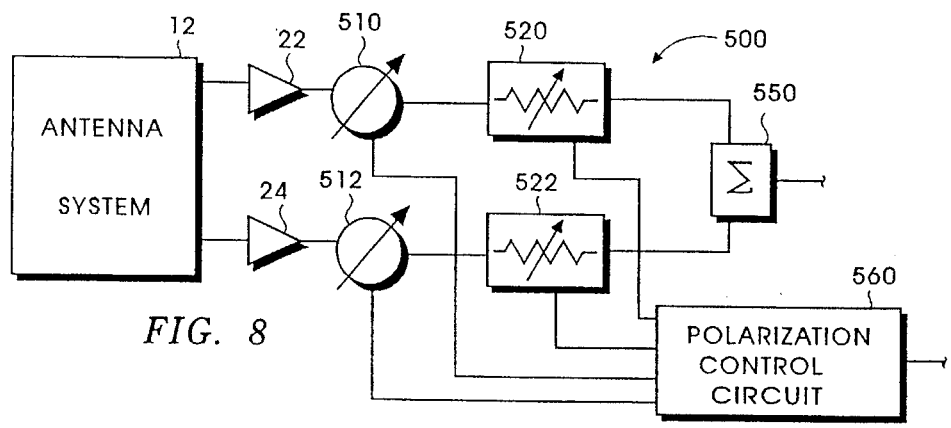
FIG. 8 is a schematic diagram of still another alternate embodiment of the apparatus of the present invention.

FIG. 8 shows another alternate embodiment of the present invention, comprising circuit apparatus 500. Again, the antenna system 12 and the LNAs 22 and 24 are included in the apparatus. Two phase shifters are included in circuit apparatus 500 to allow the feed to receive either RHCP, LHCP, or any sense of linear polarizations.

A first phase shifter is used to switch between a zero (0) degree position for the reception of linearly polarized signals and either a plus or a minus ninety (90) degree position for the reception of circularly polarized signals. A second phase shifter is used to switch between a zero (0) and a one-hundred eighty (180) degree position for the reception of either of the orthogonal frequency reuse bands.

It is understood that a single phase shifter with positions of (0), (+90), (180), and (−90) degrees may also be used in the circuit to receive all senses of linear or RHCP and LHCP polarizations. Such a single phase shifter can be placed in either of the orthogonal signal paths. The function of a phase shifter, as in all the embodiments of the present invention, is to provide a phase shift between the two orthogonal signal paths which it can accomplish by being located in either of the two orthogonal paths.

In circuit apparatus 500, the antenna system 12 connects two orthogonal signal paths to the inputs of the LNAs 22 and 24. The outputs of the LNAs 22 and 24 are connected to the inputs of a pair of phase shifters 510 and 512, respectively. The outputs of the phase shifters 510 and 512 are connected to the inputs of a pair of variable attenuators 520 and 522, respectively. The outputs of variable attenuators 520 and 522 are connected to a power combiner 550 where the RF signals from the two orthogonal paths are summed.

A polarization control circuit 560 is connected to the phase shifters 510 and 512 and to the variable attenuators 520 and 522. The polarization control circuit 560 adjusts the settings of the phase shifters and the variable attenuators for a maximum signal to noise ratio for a selected one of the frequency reuse signals.

Although the circuit 500 can adapt to the reception of either RHCP, LHCP, or any sense of linear polarization, it is understood that this circuit may be utilized with an antenna system having the capability of receiving RF signals from more than one transmitting source. If the circuit is used to receive satellite transmissions, it is not unusual for a first satellite to transmit linearly polarized signals and a second satellite to transmit circularly polarized signals. The first satellite could transmit vertically and horizontally polarized signals for its two frequency reuse bands, while the second satellite would be transmitting RHCP and LHCP for its two frequency bands.

The two satellites would typically have different locations and the receiving antenna would have movement allowing it to be aimed at either satellite without interference from the other satellite. A transmitting source can effectively transmit only two frequency reuse signals in the same frequency bandwidth and would select either a linearly polarized or a circularly polarized transmission format.

Figure 9:
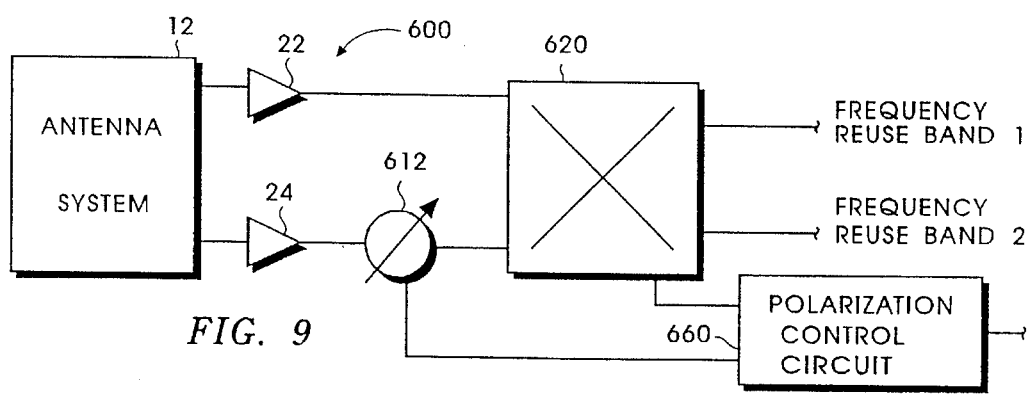
FIG. 9 is a schematic diagram of still another alternate embodiment of the apparatus of the present invention.

FIG. 9 shows another alternate embodiment of the present invention in circuit apparatus 600. Again, the antenna system 12 and the LNAs 22 and 24 are included. Circuit 600 utilizes a variable coupler 620 to adjust the coupling ratios between the two orthogonal signal paths. The variable coupler 620 performs the function of summing the signals from the two orthogonal signal paths in addition to adjusting the coupling ratios.

A phase shifter 612 is used to adjust the circuit for receiving any sense of linearly polarized signals. However, a substantial range of linearly polarized signals can be received with only a fixed ninety degree phase shifter and a variable hybrid coupler.

In circuit apparatus 600, the antenna system 12 connects two orthogonal RF signal paths to the inputs of the LNAs 22 and 24. The output of LNA 24 is connected to the input of a phase shifter 612. The output of the phase shifter 612 and the LNA 22 are connected to the variable coupler 620 at separate input ports. A polarization control circuit 660 is connected to the variable coupler 620 and to the phase shifter 612. The phase shifter 612 will typically have minus ninety (–90) and plus ninety (+90) degree positions.

The polarization control circuit 660 will adjust the coupling in the variable coupler 620 and the phase shifter 612 for a maximum signal to noise to ratio for each of the frequency reuse bands. The adjustment of the variable coupler 620 and the phase shifter 612 to give a maximum signal to noise ratio for each of the frequency reuse bands will be substantially the same.

Figure 10:
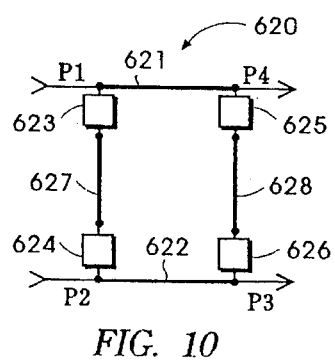
FIG. 10 is a schematic diagram of a variable coupler.

FIG. 10 discloses a circuit for the variable coupler 620. Four variable resistors or variable attenuators are used to adjust the coupling value. There are four interconnecting conductors 621, 622, 627, and 628 which are typically one-quarter wavelength long at the desired operating frequency. The variable resistors could be constructed from pin diode circuits.

In the circuit apparatus of coupler 620, an input port P1 is connected to the conductor 621 and to a variable resistor 623. An input port P2 is connected to conductor 622 and to a variable resistor 624. An output port P3 is connected to conductor 622 and to a variable resistor 626. An output port P4 is connected to the conductor 621 and to a variable resistor 625. A conductor 627 is connected between variable resistors 623 and 624, while a conductor 628 is connected between variable resistors 625 and 626. The interconnecting conductors 621, 622, 627, and 628, as indicated, are typically one-quarter of a wavelength long between the connection points at the desired operating frequency. For example, conductor is typically one-quarter of a wavelength long between ports P1 and P4.

In the coupler apparatus 620, well known and understood elements, such as capacitors and elements of the biasing circuit, have been omitted.

Figures 11A, 11B:
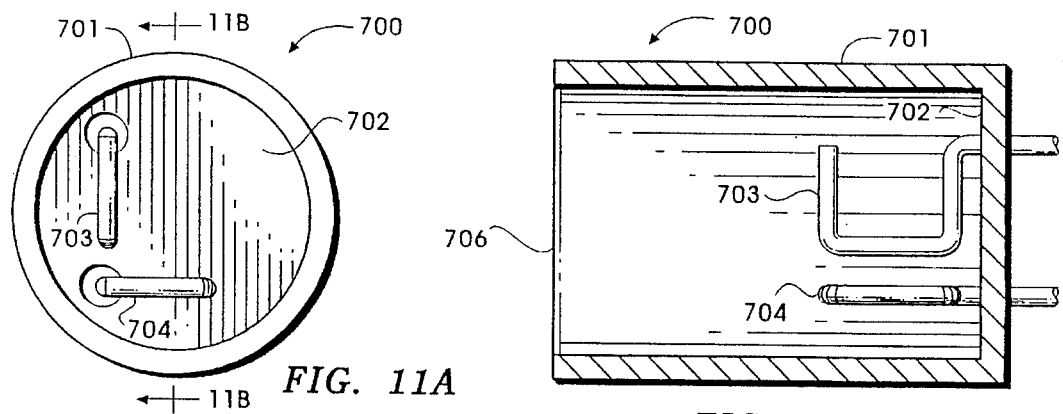
FIG. 11A is a front view of a feed embodying the present invention.
FIG. 11B is a view in partial section taken generally along line 11B—11B of FIG. 11A.

FIGS. 11A and 11B show a preferred antenna embodiment 700 for the antenna system used with the circuit apparatus described herein. FIG. 11A is a front view of the feed 700, while FIG. 11B is a view in partial section taken generally along line 11B—11B of FIG. 11A. For the following discussions of the feed 700, reference will be made to both FIGS. 11A and 11B.

The feed 700 includes a generally cylindrical waveguide 701 having a back wall 702 and a front end 706. The front end 706 is open. Extending through the back wall 702 is a pair of probes 703 and 704. Probe 703 is positioned to be generally orthogonal to probe 704.

Feed 700 offers the advantage of treating both of the orthogonal signals equally. It is important that each of the orthogonal signals travel equal phase lengths or distances through the feed to the input of the amplifiers. Many feed designs of the prior art have unequal path lengths for the two orthogonal signal paths.

Feed 700 with the two orthogonal probes extending through the back wall also offers the advantage of having the two probes exit the waveguide onto the same plane, the back wall 702, which allows better utilization of the polarization circuit design. Although U-shaped probes are shown in FIGS. 11A and 11B, it is understood that may different shapes of probes can be utilized for a feed design of this type.

Figure 12:
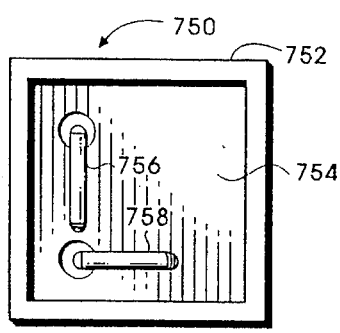
FIG. 12 is a front view of an alternate embodiment of the apparatus of FIGS. 11A and 11B.

FIG. 12 comprises a front view of feed apparatus 750. The feed apparatus 750 includes a generally square wave guide 752, a back wall 754, and a pair of probes 756 and 758. The probes 756 and 758 are oriented substantially orthogonal to each other. The probes 756 and 758 extend through the back wall 754.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Electronically adaptable polarization feed apparatus for receiving polarized radio frequency (RF) signals for providing a maximum signal to noise ratio of the received RF signal comprising, in combination:

antenna means for receiving polarized RF signals, and having a first port for receiving components of a first polarization sense of an RF signal and a second port for receiving components of a second polarization sense of the RF signal, and in which the second polarization sense is substantially orthogonal to the first polarization sense;

first amplifier means connected to the first port of the antenna means for amplifying the components of the first polarization sense;

first variable attenuating means connected to the first amplifier means for attenuating only the amplified components of the first polarization sense;

second amplifier means connected to the second port of the antenna means for amplifying the components of the second polarization sense;

second variable attenuating means connected to the second amplifier means for attenuating only the amplified components of the second polarization sense;

switchable one hundred eighty degree phase shift means for providing a desired phase relationship between the components of the first polarization sense and the components of the second polarizations sense;

a single combiner for combining the components of the first and second polarization senses from the first and second attenuating means; and means for adjusting the first and second variable attenuating means and for switching the phase shift means to provide a maximum signal to noise ratio of the received RF signal.

2. The apparatus of claim 1 in which the phase shift means includes a zero degree and a one-hundred-eighty degree phase position for the reception of linearly polarized signals.

3. The apparatus of claim 1 in which the phase shift means includes a plus ninety and a minus ninety degree phase position for the reception of circularly polarized signals.

4. The apparatus of claim 1 in which the first and second variable attenuating means includes variable resistors.

5. The apparatus of claim 1 in which the first and second variable attenuating means includes variable gain amplifiers.

6. The apparatus of claim 1 in which the phase shift means includes a hybrid coupler and pin diodes.

7. The apparatus of claim 1 in which the antenna means includes waveguide means having a back wall and a first probe extending through the back wall and a second probe orthogonal to the first probe and extending through the back wall.

8. The apparatus of claim 7 in which the waveguide means further includes a circular waveguide.

9. The apparatus of claim 7 in which the waveguide means further includes a square waveguide.

10. Electronically adaptable polarization feed apparatus for receiving polarized radio frequency (RF) signals for providing a maximum signal to noise ratio of the received RF signal comprising, in combination:

antenna means for receiving polarized RF signals, and having a first port for receiving components of a first polarization sense of an RF signal and a second port for receiving components of a second polarization sense of the RF signal, and in which the second polarization sense is substantially orthogonal to the first polarization sense;

first amplifier means connected to the first port of the antenna means for amplifying the components of the first polarization sense;

first variable attenuating means connected to the first amplifier means for attenuating only the amplified components of the first polarization sense;

second amplifier means connected to the second port of the antenna means for amplifying the components of the second polarization sense;

second variable attenuating means connected to the second amplifier means for attenuating only the amplified components of the second polarization sense;

a switchable one hundred eighty degree phase shifter and a switchable ninety degree phase shifter for the selectable reception of linearly polarized signals and circularly polarized signals, respectively;

combining means for combining the components of the first and second polarization senses from the first and second attenuating means; and means for adjusting the first and second variable attenuating means and for switching the selected phase shifter to provide a maximum signal to noise ratio of the received RF signal.

11. The apparatus of claim 10 in which the phase shifters include a hybrid coupler and pin diodes.

* * * * *